(12) United States Patent
Zhao et al.

(10) Patent No.: US 9,097,950 B2
(45) Date of Patent: Aug. 4, 2015

(54) LIQUID CRYSTAL DISPLAY PANEL AND APPARATUS HAVING THE LIQUID CRYSTAL DISPLAY PANEL

(75) Inventors: Guo Zhao, Guangdong (CN); Tao Ding, Guangdong (CN); Ming Liu, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 378 days.

(21) Appl. No.: 13/700,407

(22) PCT Filed: Sep. 4, 2012

(86) PCT No.: PCT/CN2012/080973
§ 371 (c)(1),
(2), (4) Date: Nov. 27, 2012

(87) PCT Pub. No.: WO2014/023050
PCT Pub. Date: Feb. 13, 2014

(65) Prior Publication Data
US 2014/0036191 A1 Feb. 6, 2014

(30) Foreign Application Priority Data
Aug. 6, 2012 (CN) .......................... 2012 1 0276385

(51) Int. Cl.
G02F 1/1343 (2006.01)
G02F 1/1362 (2006.01)
G09G 3/36 (2006.01)
(52) U.S. Cl.
CPC ........ *G02F 1/136286* (2013.01); *G09G 3/3648* (2013.01); *G09G 3/3674* (2013.01); *G09G 3/3614* (2013.01); *G09G 2300/0426* (2013.01); *G09G 2310/0281* (2013.01); *G09G 2320/0209* (2013.01); *G09G 2320/0247* (2013.01); *G09G 2330/021* (2013.01)
(58) Field of Classification Search
None
See application file for complete search history.

(56) References Cited

U.S. PATENT DOCUMENTS

| 5,748,165 | A | 5/1998 | Kubota et al. |
| 8,717,523 | B2 | 5/2014 | Lee et al. |
| 2009/0262054 | A1 | 10/2009 | Hsu et al. |
| 2010/0066967 | A1 | 3/2010 | Takahashi et al. |
| 2011/0128261 | A1 | 6/2011 | Hung et al. |
| 2012/0127412 | A1* | 5/2012 | Lee et al. ...................... 349/139 |
| 2013/0141660 | A1 | 6/2013 | Wang et al. |

FOREIGN PATENT DOCUMENTS

| CN | 1115535 | 1/1996 |
| CN | 2881693 | 3/2007 |

(Continued)

*Primary Examiner* — Lucy Chien
(74) *Attorney, Agent, or Firm* — Kirton McConkie; Evan R. Witt

(57) ABSTRACT

The present invention provides a liquid crystal display panel. An Nth set of scan lines is disposed between two neighboring row of pixels. Each set of the scan lines comprises an upper scan line and a lower scan line. Gate electrodes of the thin film transistors in the neighboring row of pixels are alternatively coupled to the upper scan line and the lower scan line sequentially. An Nth data line is disposed between a 2N-1th column of pixels and a 2Nth column of pixels. The Nth data line is coupled to source electrodes of the thin film transistors of the neighboring 2N-1th column of pixels and 2Nth column of pixels.

6 Claims, 4 Drawing Sheets

(56) References Cited

FOREIGN PATENT DOCUMENTS

| CN | 101582422 | 11/2009 |
| CN | 102081246 | 6/2011 |
| CN | 102081270 | 6/2011 |
| CN | 102290026 | 12/2011 |
| CN | 102385200 | 3/2012 |
| CN | 102478736 | 5/2012 |
| CN | 102629053 | 8/2012 |

* cited by examiner

LIQUID CRYSTAL DISPLAY PANEL AND APPARATUS HAVING THE LIQUID CRYSTAL DISPLAY PANEL

BACKGROUND OF THE INVENTION

1. Field of the Invention

The present invention relates to a liquid crystal display (LCD) technology, more particularly, to a liquid crystal display panel an apparatus having the liquid crystal panel.

2. Description of the Related Art

Nowadays, LCDs are becoming the main stream of displaying technology, and are being extensively applied to various electronic products, such as a mobile phone, a PDA, a digital camera, a computer screen, a notebook screen and the like.

Please refer to FIG. 1, FIG. 1 is a schematic diagram showing a structure of pixels of a conventional LCD panel. The conventional LCD panel comprises m data lines D"1~D"m and n scan lines G"1~G"n. The scan lines cross the data lines, and a pixel (not indicated) is defined by two neighboring data lines and two neighboring scan lines crossing the two neighboring data lines. A thin film transistor (not indicated) and a liquid crystal capacitor (not indicated) are disposed in each of the pixel.

Generally speaking, the data signals transmitted on the data lines (D"1~D"m) are classified into positive polarity data signals and negative polarity data signals with respect to a reference voltage, which is the common voltage (Vcom). A data signal having a voltage higher than the common voltage Vcom is called a positive polarity data signal, and a data signal having a voltage lower than the common voltage Vcom is called a negative polarity data signal. There is no difference between the display effects of a grey scale value when it is represented by a positive polarity data signal and a negative polarity data signal.

Liquid crystal molecules are characterized in that their rotation character will be destroyed if the direction of an electrical field applied to two ends of them is not changed over a long period of time. That means, the liquid crystal molecules will no longer rotate in response to the change of the electrical field, let apart the different gray scales that are expected to be generated. In order to retain their rotation character, the electrical field applied to them must be reversed so that the liquid crystal molecules will invert at scheduled time intervals. Hence, the industry has developed various driving methods to invert the liquid crystal molecules, such as the dot inverse method.

However, the conventional driving method is to keep changing the polarity of the data voltage transmitted on the data line so as to invert the liquid crystal molecules. The frequently switched polarity of the data voltage will increase the power consumption of the LCD panel, resulting in a waste of resources.

SUMMARY OF THE INVENTION

The present invention provides a LCD panel so as to resolve the problems of flicking pictures, cross talk and high power consumption caused by the frequent change of the common electrode voltage of the color filter substrate.

According to the present invention, a liquid crystal display panel comprising a pixel matrix arranged along a row direction and a column direction, each of the pixels comprises a pixel unit and a thin film transistor, the liquid crystal display panel further comprising a source driver and a gate driver, the source driver and the gate driver disposed on a same side of the pixel matrix along the column direction;

wherein an Nth set of scan line is disposed between two neighboring row of pixels, N being a natural number, each set of the scan lines comprises an upper scan line and a lower scan line arranged along the column direction, and gate electrodes of the thin film transistors in the neighboring row of pixels are alternatively coupled to the upper scan line and the lower scan line sequentially;

an Nth data line is disposed between a 2N-1th column of pixels and a 2Nth column of pixels, and the Nth data line is coupled to source electrodes of the thin film transistors of the neighboring 2N-1th column of pixels and 2Nth column of pixels; and an Nth signal connection line is disposed and corresponds to the Nth column of pixels, the signal connection line and the data line are disposed on both sides of the corresponding column of pixels.

In one aspect of the present invention, the source driver is coupled to the data line, the scan line is coupled to the gate driver through the signal connection line;

wherein a 4N-3th signal connection line is coupled to the upper scan line of a 2N-1th set of scan lines, a 4N-2th signal connection line is coupled to the lower scan line of the 2N-1th set of scan lines, a 4N-1th signal connection line is coupled to the lower scan line of a 2Nth set of scan lines, a 4N signal connection line is coupled to the upper scan line of the 2Nth set of scan lines.

In still another aspect of the present invention, a plurality of via holes are disposed on the liquid crystal display panel, and the signal connection line is coupled to the upper scan line or the lower scan line of the set of scan lines though the via holes.

In yet another aspect of the present invention, the signal connection line and the scan line are formed by etching a same metal layer with a same mask.

The present invention further provides a LCD panel so as to resolve the problems of flicking pictures, cross talk and high power consumption caused by the frequent change of the common electrode voltage of the color filter substrate.

According to the present invention, a liquid crystal display panel, comprising a pixel matrix arranged along a row direction and a column direction, each of the pixels comprising a pixel unit and a thin film transistor;

wherein an Nth set of scan lines is disposed between two neighboring row of pixels, each set of the scan lines comprises an upper scan line and a lower scan line arranged along the column direction, and gate electrodes of the thin film transistors in the neighboring row of pixels are alternatively coupled to the upper scan line and the lower scan line sequentially; and an Nth data line is disposed between a 2N-1th column of pixels and a 2Nth column of pixels, and the Nth data line is coupled to source electrodes of the thin film transistors of the neighboring 2N-1th column of pixels and 2Nth column of pixels.

In one aspect of the present invention, the liquid crystal display panel further comprising a source driver and a gate driver, the source driver and the gate driver disposed on a same side of the pixel matrix along the column direction.

In another aspect of the present invention, an Nth signal connection line is disposed and corresponds to the Nth column of pixels, the signal connection line and the data line are disposed on both sides of the corresponding column of pixels, the source driver is coupled to the data line, the scan line is coupled to the gate driver through the signal connection line;

wherein a 4N-3th signal connection line is coupled to the upper scan line of a 2N-1th set of scan lines, a 4N-2th signal connection line is coupled to the lower scan line of the 2N-1th set of scan lines, a 4N-1th signal connection line is coupled to the lower scan line of a 2Nth set of scan lines, a 4N signal connection line is coupled to the upper scan line of the 2Nth set of scan lines.

In still another aspect of the present invention, a plurality of via holes are disposed on the liquid crystal display panel, and the signal connection line is coupled to the upper scan line or the lower scan line of the set of scan lines though the via holes.

In yet another aspect of the present invention, the signal connection line and the scan line are formed by etching a same metal layer with a same mask.

The present invention further provides a display apparatus having the LCD panel so as to resolve the problems of flicking pictures, cross talk and high power consumption caused by the frequent change of the common electrode voltage of the color filter substrate.

According to the present invention, a display apparatus comprising a liquid crystal display panel, the liquid crystal display panel comprising a pixel matrix arranged along a row direction and a column direction, each of the pixels comprising a pixel unit and a thin film transistor;

wherein an Nth set of scan lines is disposed between two neighboring row of pixels, each set of the scan lines comprises an upper scan line and a lower scan line arranged along the column direction, and gate electrodes of the thin film transistors in the neighboring row of pixels are alternatively coupled to the upper scan line and the lower scan line sequentially; and an Nth data line is disposed between a 2N-1th column of pixels and a 2Nth column of pixels, and the Nth data line is coupled to source electrodes of the thin film transistors of the neighboring 2N-1th column of pixels and 2Nth column of pixels.

In one aspect of the present invention, the liquid crystal display panel further comprising a source driver and a gate driver, the source driver and the gate driver disposed on a same side of the pixel matrix along the column direction.

In another aspect of the present invention, an Nth signal connection line is disposed and corresponds to the Nth column of pixels, the signal connection line and the data line are disposed on both sides of the corresponding column of pixels, the source driver is coupled to the data line, the scan line is coupled to the gate driver through the signal connection line; wherein a 4N-3th signal connection line is coupled to the upper scan line of a 2N-1th set of scan lines, a 4N-2th signal connection line is coupled to the lower scan line of the 2N-1th set of scan lines, a 4N-1th signal connection line is coupled to the lower scan line of a 2Nth set of scan lines, a 4N signal connection line is coupled to the upper scan line of the 2Nth set of scan lines.

In still another aspect of the present invention, a plurality of via holes are disposed on the liquid crystal display panel, and the signal connection line is coupled to the upper scan line or the lower scan line of the set of scan lines though the via holes.

In yet another aspect of the present invention, the signal connection line and the scan line are formed by etching a same metal layer with a same mask.

In contrast to the prior art, a set of scan lines is disposed between two neighboring row of pixels according to the present invention. The set of scan lines comprises an upper scan line and a lower scan line, and the upper scan line and the lower scan line respectively couple to the pixels of odd columns and even columns By performing suitably progressive scanning, dot inversion is achieved. Not only the power consumption is lowered, but also the picture is clear since the common electrode voltage of the color filter substrate is not changed frequently.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
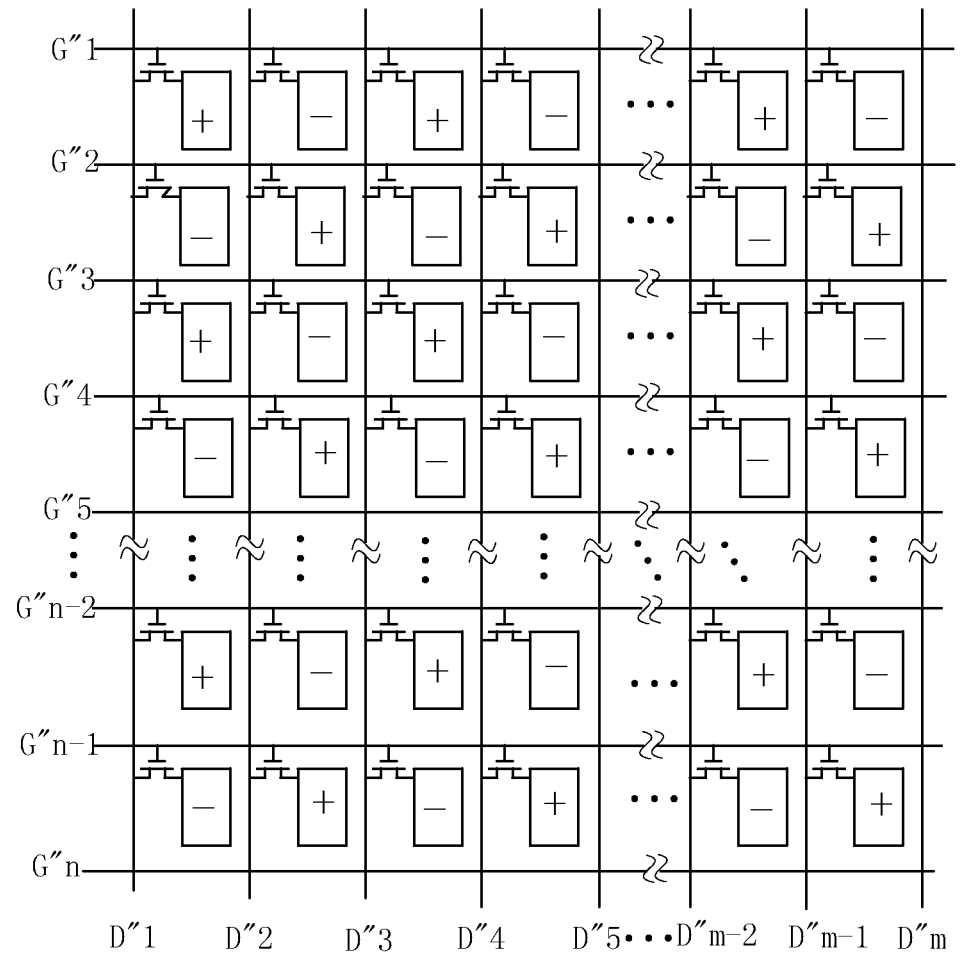
FIG. 1 is a schematic diagram showing a structure of pixels of a conventional LCD panel.
Figure 2:
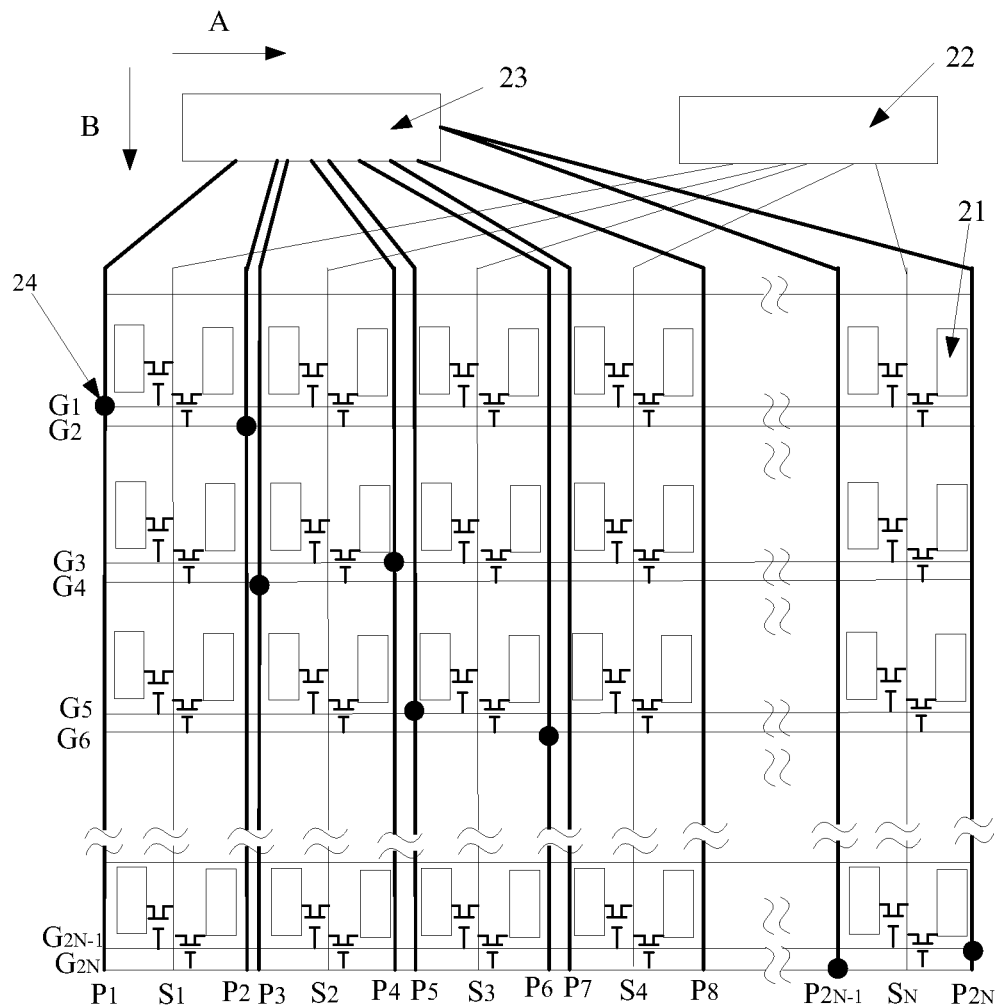
FIG. 2 is a schematic diagram showing a structure of pixels of the present invention LCD panel according to a preferred embodiment of the present invention.

Please refer to FIG. 2, FIG. 2 is a schematic diagram showing a structure of pixels of the present invention LCD panel according to a preferred embodiment of the present invention. The LCD panel 20 comprises a pixel matrix arranged along a row direction A and a column direction B. A pixel unit 21, a thin film transistor (not indicated), and a liquid crystal capacitor (not indicated) are disposed in each of the pixels. The LCD panel 20 further comprises a source driver 22 and a gate driver 23. The source driver 22 and the gate driver 23 are disposed on a same side of the pixel matrix of the LCD panel 20. For example, in FIG. 2, the source driver 22 and the gate driver 23 are disposed on an upper portion of the LCD panel 20, namely, on top of the pixel matrix along the column direction B.

According to the present invention, a set of scan lines is disposed between two neighboring row of pixels. Each set of the scan lines comprises an upper scan line $G_{2N-1}$ and a lower scan line $G_{2N}$ arranged along the column direction B. Gate electrodes of the thin film transistor in the neighboring row of pixels are alternatively coupled to the upper scan line $G_{2N-1}$ and the lower scan line $G_{2N}$ sequentially. For example, the upper scan line $G_{2N-1}$ of each set of the scan lines couples to the gate electrodes of the thin film transistors of odd columns, while the lower scan line $G_{2N}$ couples to the gate electrodes of the thin film transistors of even columns. The upper scan line $G_{2N-1}$ and the lower scan line $G_{2N}$ are used for providing scan signals to the pixel matrix.

For example, a first set of scan lines is disposed between a first row of pixels and a second row of pixels. The first set of scan lines comprises an upper scan line $G_1$ and a lower scan line $G_2$. The upper scan line $G_1$ couples to the gate electrodes of the odd-column thin film transistors of the first row. The lower scan line $G_2$ couples to the gate electrodes of the even-column thin film transistors of the first row.

Please refer to FIG. 2, an Nth data line $S_N$ is disposed between a 2N-1th column of pixels and a 2Nth column of pixels. The data line $S_N$ couples to the source driver 22. The data line $S_N$ is coupled to source electrodes of the thin film transistors of the neighboring 2N-1th column of pixels and the 2Nth column of pixels. The data line $S_N$ is used for providing grey scale voltage to the pixel matrix. For example, the second data line $S_2$ is coupled to the source electrodes of the thin film transistors of the third column of pixels and the fourth column of pixels.

Since the gate driver 23 is disposed on the upper portion of the LCD panel 20, signal connection lines are disposed so that the gate driver 23 is coupled to the scan lines $G_{2N-1}$, $G_{2N}$ through the signal connection lines. More specifically, two signal connection lines are disposed between the neighboring data lines $S_N$. Please refer to FIG. 2, the two neighboring column of pixels share one data line $S_N$. Two signal connection lines $P_{2N-1}$, $P_{2N}$ are disposed on both sides of the two neighboring column of pixels. The signal connection lines $P_{2N-1}$, $P_{2N}$ couple to the source driver 22. For example, a signal connection line $P_1$ is on the left side of the first column of pixels, a data line $S_1$ is on the right side of the first column of pixels. The data line $S_1$ is on the left side of the second column of pixels. A signal connection line $P_2$ is on the right side of the second column of pixels. A data line $S_4$ is on the left side of the eighth column of pixels. A signal connection line $P_8$ is on the right side of the eighth column of pixels. The rest may be deduced by analogy.

A 4N-3th signal connection line couples to the upper scan line $G_{2N-1}$ of a 2N-1th set of scan lines, a 4N-2th signal connection line couples to the lower scan line $G_{2N}$ of the 2N-1th set of scan lines. A 4N-1th signal connection line couples to the lower scan line $G_{2N}$ of a 2Nth set of scan lines, a 4N signal connection line couples to the upper scan line $G_{2N}$ of the 2Nth set of scan lines.

For example, the first signal connection line $P_1$ is coupled to the upper scan line $G_1$ of the first set of scan lines. The second signal connection line $P_2$ is coupled to the lower scan line $G_2$ of the first set of scan lines. A third signal connection line $P_3$ is coupled to a lower scan line $G_4$ of the second set of scan lines. A fourth signal connection line $P_4$ is coupled to an upper scan line $G_3$ of the second set of scan lines. A fifth signal connection line $P_5$ is coupled to an upper scan line $G_5$ of the third set of scan lines. A sixth signal connection line $P_6$ is coupled to a lower scan line $G_6$ of the third set of scan lines. The rest may be deduced by analogy.

According to the present invention, in order to realize the objective of coupling the signal connection lines to the scan lines $G_{2N-1}$, $G_{2N}$, via holes 24 are disposed on the LCD panel 20. The scan lines $G_{2N-1}$, $G_{2N}$ are coupled to their corresponding signal connection lines though via holes 24.

By doing so, the manner in which the upper scan lines and the lower scan lines of the even-row pixels are coupled to their corresponding signal connection lines is different from that in which the upper scan lines and the lower scan lines of the odd-row pixels are coupled to their corresponding signal connection lines.

According to the present invention, the gate driver 23 and the source driver 22 are disposed on top of the pixel matrix. The gate driver 23 is coupled to the scan lines $G_{2N-1}$, $G_{2N}$ through the signal connection line $P_N$. The signal connection lines $P_N$ distribute between the columns of pixels. The bezel on both left side and right side of the LCD panel 20 is thus narrowed. As a result, the display area is widened. For example, the bezel width on both the left side and the right side, being conventionally 13 mm, will become 7 mm with such an improvement, while the bezel width on both top side and bottom side of the LCD panel 20 is not changed. The number of source driver IC is decreased.

According to the present invention, since the signal connection lines $P_N$ and the data lines $S_N$ are both elongated along the column direction B, they may be formed by the same process. They may also be made of a same material. The cost is therefore reduced.

Figure 3:
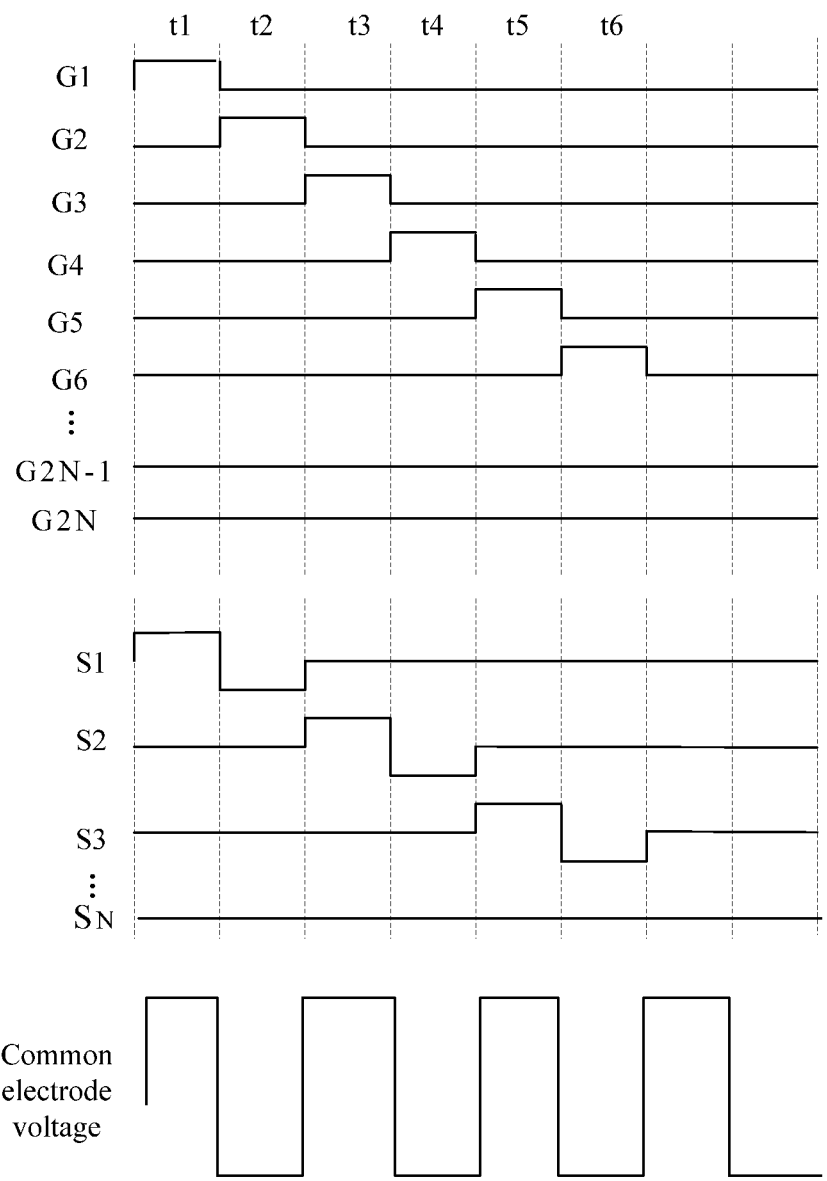
FIG. 3 is a schematic diagram showing scan signals of scan lines $G_{2N-1}$, $G_{2N}$, waveforms of data lines $S_N$, and waveforms of a common electrode in a frame period when the present invention LCD panel is driven.
Figure 4:
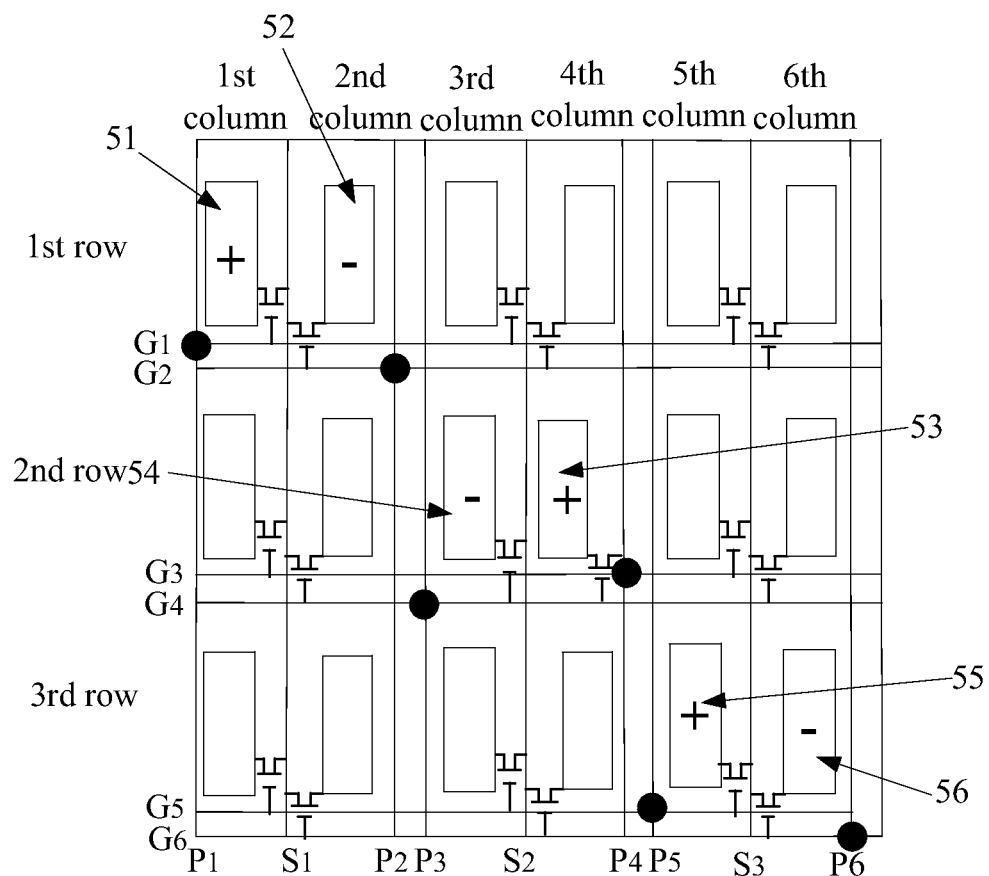
FIG. 4 is a schematic diagram showing a structure of a pixel matrix constituted by pixels of a first to a third row and a first to a sixth column according to the present invention LCD panel.

Please also refer to FIG. 3 and FIG. 4, FIG. 3 is a schematic diagram showing scan signals of scan lines $G_{2N-1}$, $G_{2N}$, waveforms of data lines $S_N$, and waveforms of a common electrode in a frame period when the present invention LCD panel is driven. FIG. 4 is a schematic diagram showing a structure of a pixel matrix constituted by pixels of a first to a third row and a first to a sixth column according to the present invention LCD panel 20.

Please refer to FIG. 2, FIG. 3, and FIG. 4, the driving method of the present invention liquid LCD panel is illustrated as following:

During the period t1, the gate driver 23 provides the scan line $G_1$ with a scan signal via the signal connection line $P_1$. The odd-column (the first, third, fifth column) thin film transistors of the first row of pixels are turned on. The source driver 22 provides a positive polarity gray scale voltage to the data line $S_1$. Since the data line $S_1$ is only coupled to the first and second columns of pixels, a pixel at the intersection of the first row and the first column is turned on. The light unit 51 is thus positively polarized.

During the period t2, the gate driver 23 provides the scan line $G_2$ with a scan signal via the signal connection line $P_2$. The even-column (the second, fourth, sixth column) thin film transistors of the first row of pixels are turned on. The source driver 22 provides a negative polarity gray scale voltage to the data line $S_1$. Since the data line $S_1$ is only coupled to the first and second columns of pixels, a pixel at the intersection of the first row and the second column is turned on. Hence, the light unit 52 is negatively polarized.

During the period t3, the gate driver 23 provides the scan line $G_4$ with a scan signal via the signal connection line $P_3$. The even-column thin film transistors of the second row of pixels are turned on. The source driver 22 provides a positive polarity gray scale voltage to the data line $S_2$. Since the data line $S_2$ is only coupled to the third and fourth columns of pixels, a pixel at the intersection of the second row and the fourth column is turned on. The light unit 53 is thus positively polarized.

During the period t4, the gate driver 23 provides the scan line $G_3$ with a scan signal via the signal connection line $P_4$. The odd-column thin film transistors of the second row of pixels are turned on. The source driver 22 provides a negative polarity gray scale voltage to the data line $S_2$. Since the data line $S_2$ is only coupled to the third and fourth columns of pixels, a pixel at the intersection of the second row and the third column is turned on. Hence, the light unit 54 is negatively polarized.

During the period t5, the gate driver 23 provides the scan line $G_5$ with a scan signal via the signal connection line $P_5$. The odd-column thin film transistors of the third row of pixels are turned on. The source driver 22 provides a positive polarity gray scale voltage to the data line $S_3$. Since the data line $S_3$ is only coupled to the fifth and sixth columns of pixels, a pixel at the intersection of the third row and the fifth column is turned on. The light unit 55 is thus positively polarized.

During the period t6, the gate driver 23 provides the scan line $G_6$ with a scan signal via the signal connection line $P_6$. The even-column thin film transistors of the third row of pixels are turned on. The source driver 22 provides a negative polarity gray scale voltage to the data line $S_3$. Since the data line $S_3$ is only coupled to the fifth and sixth columns of pixels, a pixel at the intersection of the third row and the sixth column is turned on. Hence, the light unit 56 is negatively polarized.

The method for driving the other pixels in other periods is similar to the driving method shown in FIG. 4 and needs not be elaborated further. It is obvious that inversion driving is achieved within a period according to the above-mentioned driving method.

In contrast to the prior art, a set of scan lines is disposed between two neighboring row of pixels according to the present invention. The set of scan lines comprises an upper scan line and a lower scan line, and the upper scan line and the lower scan line respectively couple to the pixels of odd columns and even columns By performing suitably progressive scanning, dot inversion is achieved. Not only the power consumption is lowered, but also the picture is clear because the common electrode voltage of the color filter substrate is not changed frequently.

While the present invention has been described in connection with what is considered the most practical and preferred embodiments, it is understood that this invention is not limited to the disclosed embodiments but is intended to cover various arrangements made without departing from the scope of the broadest interpretation of the appended claims.

What is claimed is:

1. A liquid crystal display panel comprising a pixel matrix arranged along a row direction and a column direction, each of the pixels comprises a pixel unit and a thin film transistor, the liquid crystal display panel further comprising a source driver and a gate driver, the source driver and the gate driver disposed on a same side of the pixel matrix along the column direction;

wherein an Nth set of scan line is disposed between two neighboring row of pixels, N being a natural number, each set of the scan lines comprises an upper scan line and a lower scan line arranged along the column direction, and gate electrodes of the thin film transistors in the neighboring row of pixels are alternatively coupled to the upper scan line and the lower scan line sequentially;

an Nth data line is disposed between a 2N-1th column of pixels and a 2Nth column of pixels, and the Nth data line is coupled to source electrodes of the thin film transistors of the neighboring 2N-1th column of pixels and 2Nth column of pixels; and an Nth signal connection line is disposed and corresponds to the Nth column of pixels, the signal connection line and the data line are disposed on both sides of the corresponding column of pixels, wherein the source driver is coupled to the data line, the scan line is coupled to the gate driver through the signal connection line;

wherein a 4N-3th signal connection line is coupled to the upper scan line of a 2N-1th set of scan lines, a 4N-2th signal connection line is coupled to the lower scan line of the 2N-1th set of scan lines, a 4N-1th signal connection line is coupled to the lower scan line of a 2Nth set of scan lines, a 4N signal connection line is coupled to the upper scan line of the 2Nth set of scan lines.

2. The liquid crystal display panel as claimed in claim 1, wherein a plurality of via holes are disposed on the liquid crystal display panel, and the signal connection line is coupled to the upper scan line or the lower scan line of the set of scan lines though the via holes.

3. The liquid crystal display panel as claimed in claim 1, wherein the signal connection line and the scan line are formed by etching a same metal layer with a same mask.

4. A display apparatus comprising a liquid crystal display panel, the liquid crystal display panel comprising a pixel matrix arranged along a row direction and a column direction, each of the pixels comprising a pixel unit and a thin film transistor;

wherein an Nth set of scan lines is disposed between two neighboring row of pixels, each set of the scan lines comprises an upper scan line and a lower scan line arranged along the column direction, and gate electrodes of the thin film transistors in the neighboring row of pixels are alternatively coupled to the upper scan line and the lower scan line sequentially; and an Nth data line is disposed between a 2N-1th column of pixels and a 2Nth column of pixels, and the Nth data line is coupled to source electrodes of the thin film transistors of the neighboring 2N-1th column of pixels and 2Nth column of pixels, wherein the liquid crystal display panel further comprising a source driver and a gate driver, the source driver and the gate driver disposed on a same side of the pixel matrix along the column direction, wherein an Nth signal connection line is disposed and corresponds to the Nth column of pixels, the signal connection line and the data line are disposed on both sides of the corresponding column of pixels, the source driver is coupled to the data line, the scan line is coupled to the gate driver through the signal connection line;

wherein a 4N-3th signal connection line is coupled to the upper scan line of a 2N-1th set of scan lines, a 4N-2th signal connection line is coupled to the lower scan line of the 2N-1th set of scan lines, a 4N-1th signal connection line is coupled to the lower scan line of a 2Nth set of scan lines, a 4N signal connection line is coupled to the upper scan line of the 2Nth set of scan lines.

5. The display apparatus as claimed in claim 4, wherein a plurality of via holes are disposed on the liquid crystal display panel, and the signal connection line is coupled to the upper scan line or the lower scan line of the set of scan lines though the via holes.

6. The display apparatus as claimed in claim 4, wherein the signal connection line and the scan line are formed by etching a same metal layer with a same mask.

* * * * *